Feb. 19, 1957 F. FUSSMAN 2,781,862
COLD RECOVERY ABSORPTION SYSTEM
Filed April 3, 1952
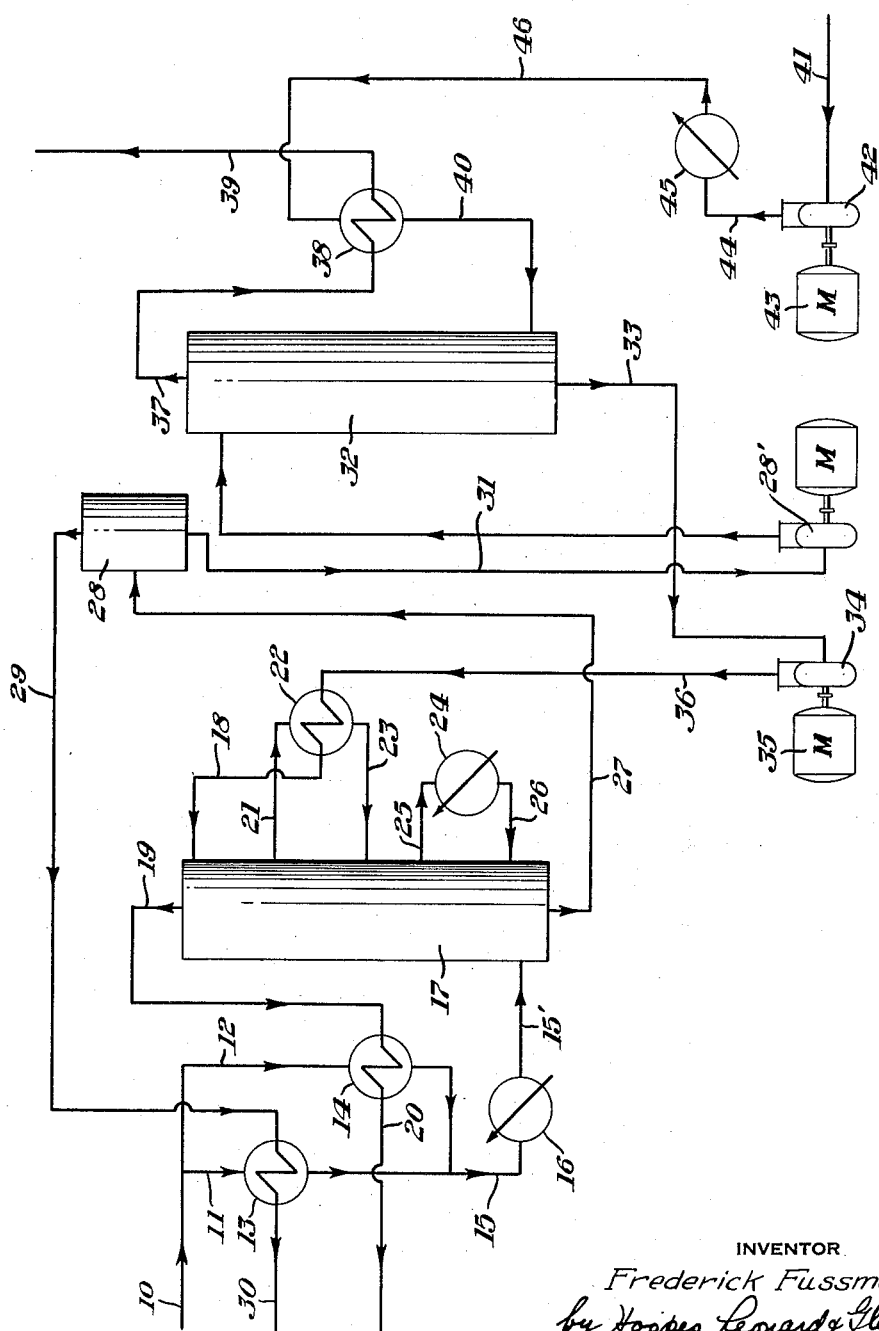
INVENTOR
Frederick Fussman
by Hoopes, Leonard & Glenn
his attorneys.

United States Patent Office 2,781,862
Patented Feb. 19, 1957

2,781,862
COLD RECOVERY ABSORPTION SYSTEM

Frederick Fussman, New York, N. Y., assignor, by mesne assignments, to Blaw-Knox Company, Pittsburgh, Pa., a corporation of Delaware Application April 3, 1952, Serial No. 280,262

2 Claims. (Cl. 183—114)

This invention relates to a low temperature system for absorbent "cold" economy and regeneration for a preferred absorbent like methanol which has been used to remove undesired components such as carbon dioxide and hydrogen sulfide for example from gases for fuel or manufacturing purposes. More particularly, this invention relates to a continuous system for maintaining such an absorbent at low temperature and also stripping it of such undesired components at low temperature in a gas atmosphere generally inert to methanol and other substances present.

By means of the so-called "Rectisol" process, operated by Lurgi Gesellschaft fuer Waermetechnik G. m. b. H. and Gesellschaft fuer Linde's Eismachinen A. G., a number of industrial gases such as coke oven gas, petroleum refinery gases, natural gas, water gas, and gas intended for synthesis processes may be treated for the removal of undesired components such as, for example, carbon dioxide, hydrogen sulfide and various inorganic and organic sulphur compounds. Methanol has been found to be the most effective absorbent as a practical matter from an over-all standpoint. The Rectisol operation may be conducted at superatmospheric pressures and at subatmospheric temperatures that may be as low as about −80° Fahrenheit. The undesired component or components were dissolved in the absorbent to the extent to be attained under the circumstances and conditions provided. The heat of absorption tended to raise the temperature of the absorbent in the process and cooling means were employed when necessary to restrain temperature increases in the absorption stage. A further temperature rise occurred in the regeneration of the absorbent by the heating thereof, after the "rich" absorbent had been removed from the absorption stage, to drive off the dissolved undesired components. Substantial "cold" losses were encountered in the relatively high temperature stripping and in the additional refrigeration required to minimize methanol losses in the gas leaving the stripper. Following the regeneration stage, extensive refrigeration was required to lower the temperature of the remaining absorbent with any make-up quantity added thereto to the temperature prescribed for the absorption stage of the Rectisol process.

By means of the present invention, the new system is continuous and maintained at the lowest possible energy level for the particular operation being conducted in cooperation with an absorption stage operation like that of the Rectisol process. Thus, in the new system an absorbent like methanol usually of commercial purity is introduced into an absorber at predetermined low temperature and elevated pressure conditions to dissolve an unwanted component like carbon dioxide in the gas fed to the absorber for purification. Following the absorber, the rich absorbent with the unwanted component therein is usually flashed before being conducted to a stripper. In the stripper, an inert gas like nitrogen is introduced for the purpose of stripping the carbon dioxide and at the same time recovering the cold originally in the absorbent, in terms of negative B. t. u.'s, to return the absorbent being stripped to a low temperature usually suitable for direct reintroduction into the absorber. At the same time, by this invention no dilution of the absorbent by steam can occur in the stripper. In all portions of the new system of this invention, cold recovery is a principal feature resulting in a marked advantage by substantially lowering the refrigeration that would otherwise be required.

Other objects and advantages will be apparent from the following description and from the schematic flow diagram setting forth one operation of this invention by way of example and not by way of any limitation of this invention to that example.

Referring to the drawing, a raw gas containing an unwanted component like carbon dioxide is continuously fed through a pipe 10. Pipe 10 may be continued in the form of two branch pipes 11 and 12 for the purpose of passing through heat exchangers 13 and 14 respectively. Pipe 12 on the outlet side of heat exchanger 14 rejoins branch pipe 11 on its outlet side from heat exchanger 13, all of the raw gas continuing through pipe 15. In heat exchangers 13 and 14 the raw gas is cooled and may be further cooled by passing through a refrigerated cooler 16, the outlet of which is connected to pipe 15' which in turn is connected to an absorption tower 17 which the raw gas enters.

Raw gas rises countercurrent to the movement of a liquid absorbent like methanol introduced into absorber 17 through a pipe 18 above the raw gas inlet. Absorber 17 may be a packed or bubble type of tower. In rising through tower 17, carbon dioxide in the cooled raw gas is absorbed by the methanol to an extent determined by the particular conditions of the operation at the time being. The raw gas purified in absorber 17 by the removal of carbon dioxide therefrom flows out through a pipe 19 and enters heat exchanger 14 on the heat absorption side thereof. Exchanger 14, like exchanger 13, maintains the streams flowing therethrough segregated one from the other and preferably is of a countercurrent flow type. The purified gas leaves exchanger 14 through a pipe 20 at an increased temperature for storage, processing or other handling as the case may be.

The liquid methanol entering absorber 17 through pipe 18 tends to increase in temperature as it comes in contact with the raw gas moving upwardly and dissolves unwanted carbon dioxide or other unwanted component in the course of that contact, leaving the raw gas correspondingly purer. The heat of absorption resulting from the absorption of carbon dioxide and/or other component by the methanol may be dissipated in part at least by removing a side stream of absorbent through a pipe 21 connected to the heat liberation side of a heat exchanger 22, the cooled absorbent returning to tower 17 through a pipe 23. The coolant for exchanger 22, which may be of the same type as exchanger 14, can be lean methanol entering absorber 17 through pipe 18. Further limitation of the temperature rise in the absorbent can be effected by circulating another side stream thereof through a refrigerated cooler 24 having an inlet pipe 25 and outlet pipe 26 connected respectively to vessel 17. Cooler 24, like cooler 16, may be a conventional adjustable type in which the amount of refrigeration applied can be regulated to suit the need.

The absorbent, rich with the dissolved carbon dioxide therein, flows out of absorber 17 through a pipe 27 the other end of which may be connected to a flash tank 28. In flash tank 28 the pressure of the rich absorbent flowing through pipe 27 is quickly reduced releasing some of the carbon dioxide dissolved in the absorbent as the principal component of the flash gas which flows out of tank 28 through a pipe 29 connected thereto. The flash gas flowing through pipe 29 may be the coolant for heat exchanger 13 to which pipe 29 is connected in the embodiment shown. The flash gas may flow out of heat exchanger 13 through a pipe 30 for venting to atmosphere or other disposition. Because of its nature an unwanted component like carbon dioxide with its non-toxic character can usually be released to the outside air.

The flashed methanol absorbent flows out of tank 28 through a pipe 31 at lower pressure and somewhat lower temperature than the pressure and temperature of the absorbent entering tank 28 through pipe 27. The other end of pipe 31 is connected to a stripper vessel 32 in which the bulk or substantially all of the unwanted component carbon dioxide is liberated from the absorbent in the course of the movement of the absorbent downwardly through stripper 32. A pump 28' may be interposed in pipe 31 to pump the liquid effluent from flash tank 28 into stripper vessel 32. Flashing may be conducted under superatmospheric or vacuum conditions and may take place in one or more stages. In some cases in the practice of this invention, the rich absorbent leaving absorber vessel 17 may be flashed directly into stripper vessel 32.

In the course of its downward passage through stripper vessel 32 the methanol becomes lean and flows out of stripper 32 through a pipe 33 into the suction side of a pump 34, such as a conventional centrifugal pump, actuated by an electric motor 35. The lean methanol is delivered by pump 34 through a pipe 36 which may be connected to the inlet on the heat absorption side of exchanger 22 as aforesaid, the lean methanol continuing from exchanger 22 through pipe 18 into tower 17.

Gaseous carbon dioxide and/or other unwanted component stripped from the absorbent plus the inert gas like nitrogen introduced into stripper 32 flows out of vessel 32 through a pipe 37 the other end of which may be connected to the inlet of the heat absorption side of a heat exchanger 38. Exchanger 38 may be like exchanger 14 in general type and character of operation. The released carbon dioxide in a gaseous state and nitrogen leave exchanger 38 through a pipe 39 as a tail gas which may be vented to atmosphere.

In recovering the cold in the absorbent while stripping the unwanted component, nitrogen gas is introduced into stripper 32 through a pipe 40 connected to the outlet on the heat liberation side of exchanger 38. Thus, the nitrogen with the gaseous material released from solution in the absorbent and the absorbent as it flows downwardly through stripper 32 are in countercurrent relation. The partial pressure effect exerted by the inert gas entering through pipe 40 is utilized in maintaining the cold economy of the new system. Thereby, cold is recovered by the liquid absorbent as it flows downwardly in vessel 32 and leaves that vessel through pipe 33 materially colder than the absorbent was when it entered. At the same time, at least the bulk of the carbon dioxide which was dissolved in the methanol when it entered stripper 32 through pipe 31, is removed. For more precise control of this new cold recovery system, a side stream of liquid absorbent may be withdrawn from stripper 32 and circulated through a by-pass cooler (not shown) before being returned to vessel 32 to regulate the temperature of the side stream portion before re-entering vessel 32 to obtain such control. Moreover in the new system no steam is required to strip the absorbent and loss of methanol is minimized without the use of additional refrigeration.

Nitrogen or any gas, such as air, which is nonreactive with and of relatively low solubility in the methanol under operating conditions may be used as the inert gas introduced through pipe 40. In the embodiment shown, a source of nitrogen which may be at ambient temperature is introduced continuously through a pipe 41 into a blower 42 which may be turned by an electric motor 43. The nitrogen delivered by the pump passes through a pipe 44 into a conventional adjustable cooler 45 and leaves cooler 45 through a pipe 46, which may be connected to an inlet on the heat liberation side of exchanger 38.

In general, temperature and pressure operating conditions may vary relatively widely as will be well understood by those in the art and as to the absorption stage particularly by those currently familiar with the so-called "Rectisol" process. Operating pressures under the new system of this invention vary from far above atmospheric in the absorber 17 to about atmospheric in the stripper 32. Operating temperatures must be above the freezing point of the methanol solution used and are subatmospheric throughout for the methanol.

By way of example only, and not by way of limitation, the following illustration sets forth appropriate compositions, flows and operating conditions which may be present and encountered in one practice of the new system of this invention:

I. *Composition of streams entering and leaving absorption tower 17*

| Component | Entering Raw Gas, MSCF./hr.[1] | Exiting Purified Gas, MSCF./hr. | Entering "Lean" Methanol, lbs./hr.[2] | Exiting "Rich" Methanol, lbs./hr. |
|---|---|---|---|---|
| $H_2$ | 439.5 | 437.1 | | 10 |
| $N_2$ | 9.9 | 9.9 | | |
| A | 8.6 | 8.6 | | |
| $O_2$ | 1.3 | 1.1 | | 20 |
| CO | 26.4 | 26.2 | | 10 |
| $CH_4$ | 26.4 | 25.8 | | 30 |
| $C_2H_4$ | 1.3 | 0.8 | | 40 |
| $CO_2$ | 146.6 | 0.5 | 50 | 16,960 |
| $CH_3OH$ | | | 223,000 | 223,000 |
| Total | 660.0 | 510.0 | 223,050 | 240,070 |

[1] Thousand standard cubic feet per hour.
[2] Pounds per hour.

II. *Composition of streams leaving flash tank 28*

| Component | Exiting Flash Gas, MSCF./hr. | Exiting Flashed Methanol, lbs./hr. |
|---|---|---|
| $H_2$ | 2.4 | |
| $O_2$ | 0.2 | |
| CO | 0.2 | |
| $CH_4$ | 0.6 | |
| $C_2H_4$ | 0.1 | 30 |
| $CO_2$ | 19.5 | 14,700 |
| $CH_3OH$ | | 223,000 |
| Total | 23.0 | 237,730 |

III. *Composition of gaseous streams entering and leaving stripper 32*

| Component | Entering Nitrogen, MSCF./hr. | Exiting Tail Gas, MSCF./hr. |
|---|---|---|
| $N_2$ | 256.0 | 256.0 |
| $C_2H_4$ | | 0.4 |
| $CO_2$ | | 126.6 |
| $CH_3OH$ | | |
| Total | 256.0 | 383.0 |

IV. Material and operating conditions within specified pipes

| Pipe | Temperature (° Fahr.) | Pressure (p. s. i. g.)[1] |
|---|---|---|
| 10 | 80 | 107 |
| 15 | −13 | |
| 15′ | −40 | |
| 18 | −45 | |
| 19 | −45 | |
| 20 | 70 | |
| 21 | −35 | |
| 23 | −45 | |
| 25 | −35 | |
| 26 | −45 | |
| 27 | −40 | |
| 29 | −43 | 3.3 |
| 30 | 70 | |
| 31 | −43 | |
| 33 | −55 | |
| 36 | −55 | |
| 37 | −43 | |
| 39 | 75 | |
| 40 | 0 | |
| 41 | 80 | |
| 44 | 105 | 5 |
| 46 | 80 | |

[1] Pounds per square inch, gauge.

It will be seen that through the new system of this invention, the temperature of the methanol remains low materially lowering refrigeration costs. There is direct contact heat exchange between the cold methanol in the absorber 17 with the gases therein which reduces the heat exchange surface and dissipates the heat of absorption more readily. Cooperating with the foregoing is the low temperature stripper 32 in which no steam is required and hence dilution of the methanol is avoided. Further, methanol losses are kept to a minimum in stripper 32 under the temperature lowering, that is the cold recovery influence of the inert gas like nitrogen continuously introduced into the vessel 32. Thereby, in this new system there is a recoverable refrigerating effect obtained with the use of the inert stripping gas which not only provides such cold recovery and thereby minimizes solvent loss without the use of additional refrigeration.

As will be understood by those skilled in the art, a variety of material and operating conditions, materials and ranges may be used in various practices of this invention without departing from the scope thereof as defined by the appended claims.

I claim:

1. In a cold recovery system for methanol having unwanted carbon dioxide or other unwanted gaseous component dissolved therein, the steps comprising, continuously introducing said methanol into a stripper vessel substantially at subzero temperature, and continuously introducing a gas inert to said methanol into said stripper vessel to flow in countercurrent relation to said methanol and at a temperature relative to said methanol to lower the temperature thereof and strip said gaseous component therefrom.

2. In a cold recovery system for separating an acid gas methanol in which said acid gas is dissolved under subzero temperature conditions, said methanol having a freezing point below said subzero temperature conditions, the steps comprising, conducting a solution of such acid gas and methanol into an enclosed stripping zone at a subzero temperature, conducting an inert gas of relatively low solubility in said methanol into contact with said solution in said stripping zone at a temperature higher than said subzero temperature, said inert gas being at substantially atmospheric pressure and so conducted into said stripping zone in such quantity and at such temperature relative to said solution that said acid gas separates from said methanol while the temperature of said methanol is retained at least as low substantially as its temperature was upon its introduction into said stripping zone.

References Cited in the file of this patent

UNITED STATES PATENTS

| | | |
|---|---|---|
| 1,942,131 | Baumann et al. | Jan. 2, 1934 |
| 1,985,548 | Pyzel | Dec. 25, 1934 |
| 2,048,656 | Hunt et al. | July 21, 1936 |
| 2,185,989 | Roberts | Jan. 2, 1940 |
| 2,241,717 | Robinson et al. | May 13, 1941 |
| 2,521,233 | Latchum | Sept. 5, 1950 |
| 2,596,785 | Nelly et al. | May 13, 1952 |
| 2,649,166 | Porter et al. | Aug. 18, 1953 |

FOREIGN PATENTS

| | | |
|---|---|---|
| 286,622 | Britain | June 5, 1929 |